(12) United States Patent
Weber et al.

(10) Patent No.: US 9,323,658 B2
(45) Date of Patent: Apr. 26, 2016

(54) MULTI-MAPPED FLASH RAID

(75) Inventors: Bret S. Weber, Wichita, KS (US); Timothy E. Hoglund, Colorado Springs, CO (US); Robert E. Ober, San Jose, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 812 days.

(21) Appl. No.: 12/476,386

(22) Filed: Jun. 2, 2009

(65) Prior Publication Data

US 2010/0306452 A1 Dec. 2, 2010

(51) Int. Cl.
*G06F 12/00* (2006.01)
*G06F 12/02* (2006.01)
*G06F 3/06* (2006.01)

(52) U.S. Cl.
CPC .......... *G06F 12/0246* (2013.01); *G06F 3/0607* (2013.01); *G06F 3/0632* (2013.01); *G06F 3/0685* (2013.01); *G06F 3/0688* (2013.01); *G06F 2212/7201* (2013.01); *G06F 2212/7205* (2013.01); *G06F 2212/7211* (2013.01)

(58) Field of Classification Search
USPC .................................. 711/202, 211
See application file for complete search history.

(56) References Cited

U.S. PATENT DOCUMENTS

| | | | |
|---|---|---|---|
| 6,985,983 B2 * | 1/2006 | Pellegrino et al. ............ 710/200 |
| 7,272,687 B2 | 9/2007 | Balasubramanian | |
| 7,336,536 B2 * | 2/2008 | Louie et al. ............... 365/185.09 |
| 7,610,438 B2 * | 10/2009 | Lee et al. ...................... 711/103 |
| 7,793,061 B1 * | 9/2010 | Gupta et al. .................. 711/162 |
| 7,890,795 B1 * | 2/2011 | Madnani et al. ............... 714/6.2 |
| 2003/0123287 A1 * | 7/2003 | Gorobets .............. G06F 3/0625 365/185.11 |
| 2003/0212855 A1 * | 11/2003 | Sakaguchi ............ G06F 12/121 711/113 |
| 2004/0117522 A1 * | 6/2004 | Loffink et al. ................... 710/74 |
| 2006/0241930 A1 * | 10/2006 | Oshins et al. .................... 703/24 |
| 2007/0168564 A1 * | 7/2007 | Conley et al. ..................... 710/1 |
| 2007/0288692 A1 * | 12/2007 | Bruce et al. .................... 711/113 |
| 2008/0040540 A1 * | 2/2008 | Cavallo ................ G06F 3/0613 711/114 |
| 2008/0052451 A1 * | 2/2008 | Pua et al. ....................... 711/103 |
| 2008/0082743 A1 * | 4/2008 | Hanebutte ........... G06F 12/0866 711/113 |
| 2008/0098158 A1 * | 4/2008 | Kitahara ....................... 711/103 |
| 2008/0120487 A1 * | 5/2008 | Saripalli ....................... 711/206 |
| 2008/0229071 A1 * | 9/2008 | Shioya ................ G06F 12/0862 712/207 |
| 2009/0113235 A1 * | 4/2009 | Selinger ............................ 714/6 |
| 2009/0240873 A1 * | 9/2009 | Yu et al. ........................ 711/103 |
| 2010/0125695 A1 * | 5/2010 | Wu ....................... G06F 3/0613 711/103 |

OTHER PUBLICATIONS

IEEE 100, The Authoritative Dictionary of IEEE Standards of Terms, Seventh Edition, Teh Institute of Electrical and Electronics Engineers, Inc. Dec. 2000, p. 1146.*
Patterson, David; Garth A. Gibson, Randy Katz (1988). "A Case for Redundant Arrays of Inexpensive Disks (RAID)". SIGMOD Conference: pp. 109-116. retrieved Dec. 31, 2006.
U.S. Appl. No. 12/183,262, filed Jul. 31, 2008, by Hariharan Kamalavannan, et al.
U.S. Appl. No. 12/210,051, filed Sep. 12, 2008, by Prakash Palanichamy, et al.

* cited by examiner

*Primary Examiner* — Gurtej Bansal

(57) ABSTRACT

Disclosed is a storage system. The storage system includes a redundant array of inexpensive disks (RAID) controller. The RAID controller includes a flash memory controller coupled to a flash memory. The flash memory controller may perform background management tasks. These include logging and error reporting, address translation, cache table management, bad block management, defect management, wear leveling, and garbage collection. The array controller also allows the flash memory to be divided into multiple mappings.

20 Claims, 3 Drawing Sheets

MULTI-MAPPED FLASH RAID

BACKGROUND OF THE INVENTION

Mass storage systems continue to provide increased storage capacities to satisfy user demands. Photo and movie storage, and photo and movie sharing are examples of applications that fuel the growth in demand for larger and larger storage systems.

A solution to these increasing demands is the use of arrays of multiple inexpensive disks. These arrays may be configured in ways that provide redundancy and error recovery without any loss of data. These arrays may also be configured to increase read and write performance by allowing data to be read or written simultaneously to multiple disk drives. These arrays may also be configured to allow "hot-swapping" which allows a failed disk to be replaced without interrupting the storage services of the array. Whether or not any redundancy is provided, these arrays are commonly referred to as redundant arrays of independent disks (or more commonly by the acronym RAID). The 1987 publication by David A. Patterson, et al., from the University of California at Berkeley titled "A Case for Redundant Arrays of Inexpensive Disks (RAID)" discusses the fundamental concepts and levels of RAID technology.

RAID storage systems typically utilize a controller that shields the user or host system from the details of managing the storage array. The controller makes the storage array appear as one or more disk drives (or volumes). This is accomplished in spite of the fact that the data (or redundant data) for a particular volume may be spread across multiple disk drives.

SUMMARY OF THE INVENTION

An embodiment of the invention may therefore comprise a storage array controller, comprising: a RAID controller; a flash memory controller configured to map a first range of flash memory as an I/O device, and a second range of flash memory as system memory.

An embodiment of the invention may therefore further comprise a computer peripheral, comprising: a RAID controller projecting a first disk drive as a first logical unit number; and, a flash controller, integrated with said RAID controller, projecting a first address range of a flash memory device as a second logical unit number.

DETAILED DESCRIPTION OF THE EMBODIMENTS

Figure 1:
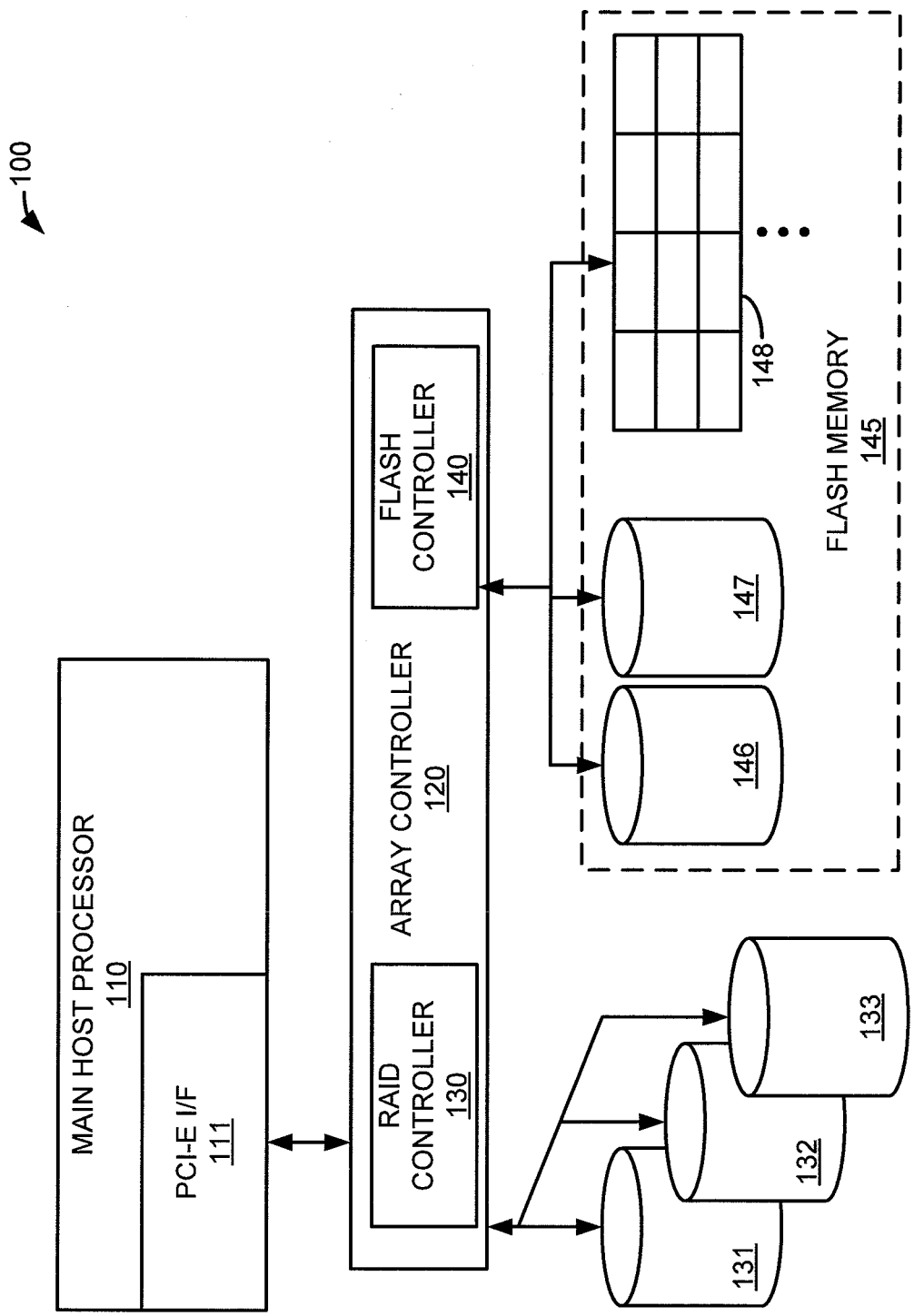
FIG. 1 is a block diagram of a storage system.

FIG. 1 is a block diagram of a storage system. Storage system 100 comprises main host processor 110, array controller 120, disk drives 131-133, and flash memory 145. Main host processor 110 includes PCI express (PCIe) interface 111. Array controller 120 includes RAID controller 130 and flash controller 140. Disk drives 131-133 are operatively coupled to array controller 120. Flash memory 145 is operatively coupled to flash controller 140.

Array controller 120 together with main host processor 110 may be, or comprise, controllers that are compatible with or described by, for example, InfiniBand, Redundant Array of Inexpensive Disks (RAID), Network Attached Storage (NAS), Storage Array Network (SAN), iSCSI SAN, or a Virtual Tape Library (VTL). Array controller 120 may be implemented on a single integrated circuit. In this case, array controller 120 may be referred to as RAID-on-a-chip (ROC).

In an embodiment, flash memory 145 is divided into a plurality of address ranges. These address ranges may be mapped by flash controller 140 into different functions. For example, flash controller 140 may map flash memory 145 into a first block of memory that appears to storage system 100 as logical disk drives 146 and 147. Flash controller 140 may map a second block of flash memory 145 to appear to storage system 100 as memory 148. In other words, flash controller 140 may map one block of flash memory 145 to appear as an I/O device that needs to be written to, and read from, via a controller (such as RAID controller 130). Flash controller 140 may map another block of flash memory 145 to appear as memory that may be directly written to, and read from, by main host processor 110.

Array controller 120 includes RAID controller 130 and flash controller 140. Array controller 120 may also include a processor or other circuitry to control flash memory 145. This processor may also perform background management tasks. Array controller 120 may perform tasks that include logging and error reporting. Other functions that may be included in array controller 120 or flash controller 140 may include address translation, cache management, cache table management, bad block management, defect management, wear leveling, and garbage collection.

In an example, wear leveling includes distributing flash memory writes to increase flash memory lifetime. In another example, address translation includes translating addresses between I/O device addresses and ranges of flash memory. In another example, bad block management or defect management may include preventing data from being read from a defective flash memory block. In another example, cache management or cache table management may include using a range of flash memory as a disk data cache.

Array controller 120 and flash controller 140 may project portions of flash memory 145 in a variety of ways. These include, for example, projecting a logical device (or logical unit number—LUN). Thus, logical disk drives 146 and 147 may appear to storage system 100 as fast disk drives. In another example, array controller 120 and flash controller 140 may project a portion of flash memory 145 as memory (e.g., memory 148) in PCIe address space. This projection of memory 148, for example, may appear to main host processor as memory on a PCIe device. In another example, memory 148 may be accessible by a host driver or RAID controller 130 that may be used as a pseudo serial ATA (SATA) or pseudo serial attached SCSI (SAS) disk.

In an embodiment, multiple mappings (or projections) of flash memory 145 are supported by array controller 120. Thus, a portion of flash memory (e.g., memory 148) may be dedicated to the operating system as an extension of cache, while another portion is mapped into RAID logical units (e.g., logical disks 146 and 147). In another example, memory 148 may be projected as memory in the PCIe address space, while another portion of flash memory 145 is projected as a local SATA or SAS drive (e.g., logical disks 146 and 147). It should be understood that the aforementioned are merely representative examples and that any combination, number of combinations, and permutations of mappings are possible.

Figure 2:
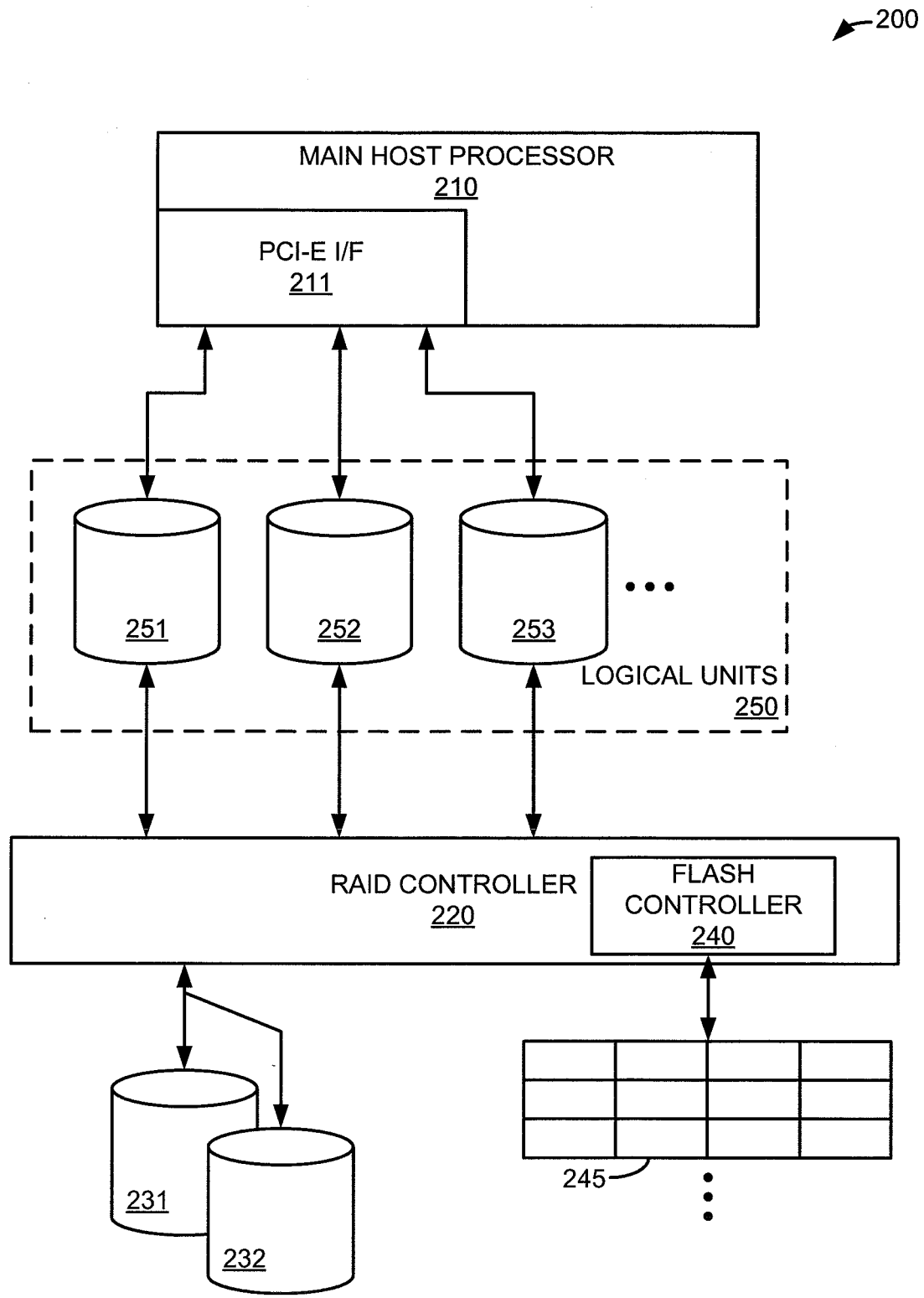
FIG. 2 is a block diagram of a storage system.

FIG. 2 is a block diagram of a storage system. In FIG. 2, storage system 200 comprises main host processor 210, RAID controller 220, disk drives 231-232, flash memory 245, and logical units 250. Main host processor 210 include PCIe interface 211. RAID controller 220 includes flash controller 240. Logical units 250 includes logical unit 251, logical unit 252, and logical unit 253.

Array controller 220 together with main host processor 210 may be, or comprise, controllers that are compatible with or described by, for example, InfiniBand, Redundant Array of Inexpensive Disks (RAID), Network Attached Storage (NAS), Storage Array Network (SAN), iSCSI SAN, or a Virtual Tape Library (VTL). Array controller 220 may be implemented on a single integrated circuit. In this case, array controller 220 may be referred to as RAID-on-a-chip (ROC).

Disk drives 231 and 232 are operatively coupled to RAID controller 220. Flash memory 245 is operatively coupled to flash controller 240. RAID controller 220, in cooperation with flash controller 240, may be configured to project logical units 250. This is shown in FIG. 2 by the arrows connecting RAID controller 220 and each logical unit 251-253. Logical units 251-253 appear to main host processor 210 as individual disk drives. This is shown in FIG. 2 by the arrows connecting RAID controller 220 and each logical unit 251-253. Thus, main host processor 210 may access portions of disk drives 231-232, and flash memory 245, as if it were accessing disk drives connected via PCIe interface 211.

RAID controller 220 includes flash controller 240. RAID controller 220 may also include a processor or other circuitry to control flash memory 245. This processor may also perform background management tasks. RAID controller 220 may perform tasks that include logging and error reporting. Other functions that may be included in RAID controller 220 or flash controller 240 may include address translation, cache table management, bad block management, defect management, wear leveling, and garbage collection.

RAID controller 220 and flash controller 240 may project portions of flash memory 245 in a variety of ways. Illustrated in FIG. 2, for example, is the projection of a plurality of logical units 251-253 (or logical unit numbers—LUNs). Thus, portions of flash memory 245 may appear to storage system 200 as fast disk drives, fast sectors, cylinders, or tracks, associated with logical units 251-253. In another example, RAID controller 220 and flash controller 240 may project a portion of flash memory 245 as simple memory in PCIe address space. This projection, for example, may appear to main host processor 210 as memory on a PCIe device. In another example, a portion of flash memory 245 may be accessible by a host driver, or RAID controller 220, as a pseudo serial ATA (SATA) or pseudo serial attached SCSI (SAS) disk.

In an embodiment, multiple mappings (or projections) of flash memory 245 are supported by RAID controller 220. Thus, a portion of flash memory 245 may be dedicated to the operating system as an extension of cache, while another portion is mapped into RAID logical units (e.g., logical units 251-253). In another example, flash memory 245 may be projected as memory in the PCIe address space while another portion of flash memory 245 is projected as a local SATA or SAS drive (e.g., logical units 251-253). It should be understood that the aforementioned examples are merely representative and that any combination, number of combinations, and permutations of mappings are possible.

The systems, units, drives, devices, controllers, interfaces, and functions described above may be implemented with or executed by one or more computer systems. The methods described above may be stored on a computer readable medium. Many of the elements of storage system 100, and storage system 200 may be, comprise, or include computers systems. This includes, but is not limited to main host processor 110, array controller 120, disk drives 131-133, flash memory 145, PCIe interface 111, RAID controller 130, flash controller 140, logical disk drive 146, logical disk drives 147, main host processor 210, PCIe interface 211, logical units 250 (251-253), RAID controller 220, flash controller 240, disk drive 231, disk drive 232, and flash memory 245.

Figure 3:
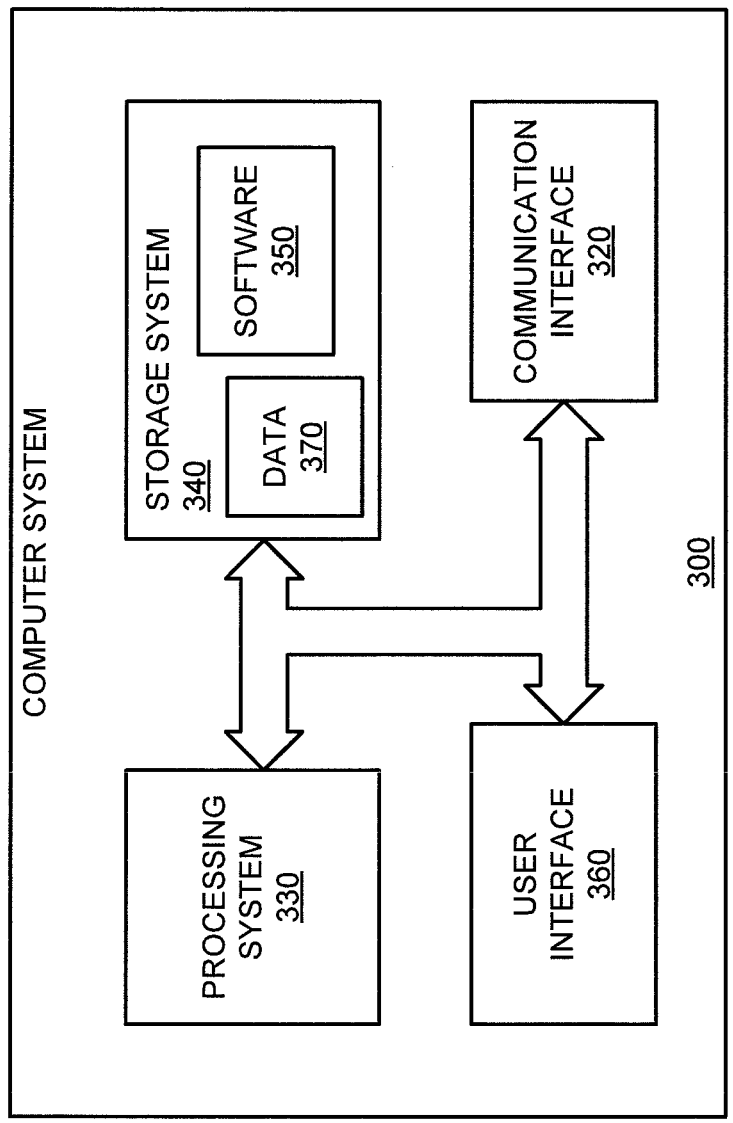
FIG. 3 is a block diagram of a computer system.

FIG. 3 illustrates a block diagram of a computer system. Computer system 300 includes communication interface 320, processing system 330, storage system 340, and user interface 360. Processing system 330 is operatively coupled to storage system 340. Storage system 340 stores software 350 and data 370. Processing system 330 is operatively coupled to communication interface 320 and user interface 360. Computer system 300 may comprise a programmed general-purpose computer. Computer system 300 may include a microprocessor. Computer system 300 may comprise programmable or special purpose circuitry. Computer system 300 may be distributed among multiple devices, processors, storage, and/or interfaces that together comprise elements 320-370.

Communication interface 320 may comprise a network interface, modem, port, bus, link, transceiver, or other communication device. Communication interface 320 may be distributed among multiple communication devices. Processing system 330 may comprise a microprocessor, microcontroller, logic circuit, or other processing device. Processing system 330 may be distributed among multiple processing devices. User interface 360 may comprise a keyboard, mouse, voice recognition interface, microphone and speakers, graphical display, touch screen, or other type of user interface device. User interface 360 may be distributed among multiple interface devices. Storage system 340 may comprise a disk, tape, integrated circuit, RAM, ROM, network storage, server, or other memory function. Storage system 340 may be a computer readable medium. Storage system 340 may be distributed among multiple memory devices.

Processing system 330 retrieves and executes software 350 from storage system 340. Processing system may retrieve and store data 370. Processing system may also retrieve and store data via communication interface 320. Processing system 350 may create or modify software 350 or data 370 to achieve a tangible result. Processing system may control communication interface 320 or user interface 370 to achieve a tangible result. Processing system may retrieve and execute remotely stored software via communication interface 320.

Software 350 and remotely stored software may comprise an operating system, utilities, drivers, networking software, and other software typically executed by a computer system. Software 350 may comprise an application program, applet, firmware, or other form of machine-readable processing instructions typically executed by a computer system. When executed by processing system 330, software 350 or remotely stored software may direct computer system 300 to operate as described herein.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A Redundant Array of Independent Disks (RAID) storage system communicatively coupled to a host processor, the storage system comprising:
a flash memory device comprising first and second partitions;
a plurality of disk drives configured as a plurality of logical units (LUNs); and
a storage controller, coupled to the flash memory device and to the disk drives, operable to map the first partition into one or more RAID logical units for handling RAID Input/Output (I/O) requests by the host processor,
the storage controller is further operable to map the second partition to the host processor as an extension of an Operating System (OS) cache, independent of RAID I/O processing, and
wherein the storage controller represents the first partition as a Serial Attached Small Computer System Interface (SAS) storage device accessible to the host processor via the storage controller, and the storage controller represents the second partition as a separate memory device having a Peripheral Component Interconnect Express (PCIe) address that is directly accessible by the host processor.

2. The storage system of claim 1, wherein:
the flash memory device further comprises a third partition; and
the storage controller is coupled to the third partition of the flash memory device to perform cache memory operations of the storage controller.

3. The storage system of claim 1, wherein:
the storage controller comprises a flash memory controller coupled to the flash memory device to partition the flash memory device.

4. The storage system of claim 1, wherein:
the storage controller is operable to provide a Peripheral Component Interconnect Express interface between the flash memory device and host processor.

5. The storage system of claim 1, wherein:
the storage controller comprises a RAID-on-a-chip (ROC) device,
the second partition is assigned a Peripheral Component Interconnect Express (PCIe) address and presented as a memory distinct from the RAID storage system.

6. The storage system of claim 1, wherein:
the storage controller presents the first partition as multiple disks accessible to the host processor via the storage controller.

7. The storage system of claim 1, wherein:
the storage controller presents the second partition to the host processor as memory that is directly writable by the host processor.

8. The storage system of claim 1, wherein:
the storage controller performs cache table management for the flash memory device.

9. The storage system of claim 1, wherein:
the storage controller performs wear leveling for the flash memory device.

10. The storage system of claim 1, wherein:
the storage controller presents the first partition to the host processor as multiple Logical Unit Numbers (LUNs).

11. A method operable in a Redundant Array of Independent Disks (RAID) storage controller communicatively coupled to a host processor, the method comprising:
partitioning a flash memory device for the storage controller into first and second partitions;
configuring a plurality of disk drives as a plurality of logical units (LUNs);
mapping the first partition into one or more RAID logical units for handling RAID Input/Output (I/O) requests by the host processor; and
mapping and providing cache memory to the host processor through the second partition of the flash memory device as an extension of an Operating System (OS) cache, independent of RAID I/O processing;
representing the first partition as a Serial Attached Small Computer System Interface (SAS) storage device accessible to the host processor via the storage controller; and
representing the second partition as an separate memory device having a Peripheral Component Interconnect Express (PCIe) address that is directly accessible by the host processor.

12. The method of claim 11, further comprising:
partitioning the flash memory device into a third partition; and
performing cache memory operations of the storage controller through the third partition of the flash memory device.

13. The method of claim 11, wherein:
the storage controller comprises a flash memory controller coupled to the flash memory device to partition the flash memory device.

14. The method of claim 11, further comprising:
providing a Peripheral Component Interconnect Express interface between the flash memory device and host processor.

15. The method of claim 11, wherein:
the storage controller comprises a RAID-on-a-chip (ROC) device,
the second partition is assigned a Peripheral Component Interconnect Express (PCIe) address and presented as a memory distinct from the RAID storage system.

16. The method of claim 11, wherein:
the storage controller presents the first partition as multiple disks accessible to the host processor via the storage controller.

17. The method of claim 11, wherein:
the storage controller presents the second partition to the host processor as memory that is directly writable by the host processor.

18. The method of claim 11, wherein:
the storage controller performs cache table management for the flash memory device.

19. The method of claim 11, further comprising:
performing wear leveling for the flash memory device.

20. The method of claim 11, wherein:
the storage controller presents the first partition to the host processor as multiple Logical Unit Numbers (LUNs).

* * * * *